United States Patent
Stopel et al.

(10) Patent No.: US 10,586,042 B2
(45) Date of Patent: *Mar. 10, 2020

(54) PROFILING OF CONTAINER IMAGES AND ENFORCING SECURITY POLICIES RESPECTIVE THEREOF

(71) Applicant: Twistlock, Ltd., Herzliya (IL)

(72) Inventors: Dima Stopel, Herzliya (IL); Liron Levin, Herzliya (IL); Lior Yankovich, Herzliya (IL)

(73) Assignee: TWISTLOCK, LTD., Herzliya (IL)

( * ) Notice: Subject to any disclaimer, the term of this patent is extended or adjusted under 35 U.S.C. 154(b) by 131 days.

This patent is subject to a terminal disclaimer.

(21) Appl. No.: 15/397,230

(22) Filed: Jan. 3, 2017

(65) Prior Publication Data

US 2017/0116415 A1    Apr. 27, 2017

Related U.S. Application Data

(63) Continuation-in-part of application No. 15/278,700, filed on Sep. 28, 2016, and a continuation-in-part of application No. 15/292,915, filed on Oct. 13, 2016.

(Continued)

(51) Int. Cl.
| | |
|---|---|
| G06F 21/00 | (2013.01) |
| G06F 21/55 | (2013.01) |
| G06F 21/52 | (2013.01) |
| G06F 21/57 | (2013.01) |
| G06F 21/53 | (2013.01) |

(52) U.S. Cl.
CPC .......... *G06F 21/554* (2013.01); *G06F 21/52* (2013.01); *G06F 21/53* (2013.01); *G06F 21/577* (2013.01); *G06F 2221/033* (2013.01)

(58) Field of Classification Search
None
See application file for complete search history.

(56) References Cited

U.S. PATENT DOCUMENTS 6,490,620 B1   12/2002   Ditmer et al.
6,502,102 B1 *  12/2002   Haswell ............. G06F 11/3664
(Continued)

OTHER PUBLICATIONS

Kovatsch, Matthias et al. Actinium: A RESTful Runtime Container for Scriptable Internet of Things Applications. 2012 3rd IEEE International Conference on the Internet of Things. https://ieeexplore.ieee.org/stamp/stamp.jsp?tp=&arnumber=6402315 (Year: 2012).*

(Continued)

*Primary Examiner* — Jeremiah L Avery
(74) *Attorney, Agent, or Firm* — M&B IP Analysts, LLC

(57) ABSTRACT

A method for securing execution of software containers using security profiles. The method comprises receiving an event indicating that a container image requires profiling, wherein the container image includes resources utilized to execute a corresponding application container; generating a security profile for the container image, wherein the generated security profile includes at least a system calls profile; monitoring the operation of a runtime execution of the application container; and detecting a violation of the security profile based on the monitored operation, wherein the security profile is of the container image corresponding to the application container.

28 Claims, 7 Drawing Sheets

Related U.S. Application Data

(60) Provisional application No. 62/274,420, filed on Jan. 4, 2016, provisional application No. 62/274,798, filed on Jan. 5, 2016, provisional application No. 62/235,644, filed on Oct. 1, 2015, provisional application No. 62/235,641, filed on Oct. 1, 2015, provisional application No. 62/241,812, filed on Oct. 15, 2015.

(56) References Cited

U.S. PATENT DOCUMENTS

| | | | |
|---|---|---|---|
| 6,523,027 B1* | 2/2003 | Underwood | G06F 9/465 |
| 6,704,873 B1* | 3/2004 | Underwood | H04L 63/02 709/223 |
| 6,732,162 B1 | 5/2004 | Wood et al. | |
| 7,100,195 B1 | 8/2006 | Underwood | |
| 7,103,740 B1 | 9/2006 | Colgrove et al. | |
| 7,577,848 B2 | 8/2009 | Schwartz et al. | |
| 7,596,227 B2 | 9/2009 | Illowsky et al. | |
| 7,640,235 B2 | 12/2009 | Shulman et al. | |
| 7,698,741 B2 | 4/2010 | Marinescu et al. | |
| 7,743,420 B2 | 6/2010 | Shulman et al. | |
| 7,752,662 B2 | 7/2010 | Shulman et al. | |
| 7,752,669 B2 | 7/2010 | Palliyil et al. | |
| 7,779,468 B1 | 8/2010 | Magdych et al. | |
| 7,861,303 B2 | 12/2010 | Kouznetsov et al. | |
| 7,882,542 B2 | 2/2011 | Neystadt et al. | |
| 8,024,804 B2 | 9/2011 | Shulman et al. | |
| 8,051,484 B2 | 11/2011 | Shulman et al. | |
| 8,056,141 B2 | 11/2011 | Shulman et al. | |
| 8,108,933 B2 | 1/2012 | Mahaffey | |
| 8,135,948 B2 | 3/2012 | Shulman et al. | |
| 8,181,246 B2 | 5/2012 | Shulman et al. | |
| 8,302,192 B1 | 10/2012 | Cnudde et al. | |
| 8,316,237 B1 | 11/2012 | Felsher et al. | |
| 8,510,571 B1 | 8/2013 | Chang et al. | |
| 8,621,613 B1 | 12/2013 | McClintock et al. | |
| 8,639,625 B1* | 1/2014 | Ginter | G06F 21/10 705/50 |
| 8,677,472 B1 | 3/2014 | Dotan et al. | |
| 8,756,683 B2 | 6/2014 | Manion et al. | |
| 8,806,625 B1 | 8/2014 | Berger | |
| 8,966,629 B2 | 2/2015 | Sallam | |
| 9,003,141 B2 | 4/2015 | Nielsen et al. | |
| 9,098,333 B1 | 8/2015 | Obrecht et al. | |
| 9,203,862 B1 | 12/2015 | Kashyap et al. | |
| 9,223,966 B1 | 12/2015 | Satish et al. | |
| 9,256,467 B1 | 2/2016 | Singh et al. | |
| 9,355,248 B1 | 5/2016 | Wiest et al. | |
| 9,594,590 B2 | 3/2017 | Hsu | |
| 9,904,781 B2 | 2/2018 | Martini et al. | |
| 9,928,379 B1 | 3/2018 | Hoffer | |
| 10,223,534 B2 | 3/2019 | Stopel et al. | |
| 2001/0007131 A1 | 7/2001 | Galasso et al. | |
| 2003/0014629 A1 | 1/2003 | Zuccherato | |
| 2003/0079145 A1 | 4/2003 | Kouznetsov et al. | |
| 2003/0120593 A1 | 6/2003 | Bansal et al. | |
| 2003/0229801 A1 | 12/2003 | Kouznetsov et al. | |
| 2003/0233566 A1 | 12/2003 | Kouznetsov et al. | |
| 2003/0233574 A1 | 12/2003 | Kouznetsov et al. | |
| 2004/0133793 A1* | 7/2004 | Ginter | G06F 21/10 713/193 |
| 2005/0120054 A1 | 6/2005 | Shulman et al. | |
| 2006/0075494 A1 | 4/2006 | Bertman et al. | |
| 2006/0230451 A1* | 10/2006 | Kramer | G06F 21/51 726/22 |
| 2006/0288420 A1* | 12/2006 | Mantripragada | G06F 21/51 726/25 |
| 2007/0112714 A1* | 5/2007 | Fairweather | G06F 8/427 706/46 |
| 2007/0130621 A1 | 6/2007 | Marinescu et al. | |
| 2007/0136282 A1 | 6/2007 | Takashima | |
| 2007/0174630 A1 | 7/2007 | Shannon et al. | |
| 2007/0240218 A1 | 10/2007 | Tuvell et al. | |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0086773 A1 | 4/2008 | Tuvell et al. | |
| 2008/0168135 A1 | 7/2008 | Redlich et al. | |
| 2008/0177994 A1* | 7/2008 | Mayer | G06F 9/4418 713/2 |
| 2008/0196104 A1 | 8/2008 | Tuvell et al. | |
| 2008/0256636 A1 | 10/2008 | Gassoway | |
| 2009/0144823 A1 | 6/2009 | Lamastra et al. | |
| 2009/0217260 A1 | 8/2009 | Gebhart et al. | |
| 2009/0319796 A1 | 12/2009 | Kim et al. | |
| 2010/0011029 A1 | 1/2010 | Niemela | |
| 2011/0179484 A1 | 7/2011 | Tuvell et al. | |
| 2011/0258701 A1 | 10/2011 | Cruz et al. | |
| 2011/0314542 A1 | 12/2011 | Viswanathan et al. | |
| 2011/0314548 A1 | 12/2011 | Yoo | |
| 2012/0008529 A1 | 1/2012 | Averbuch et al. | |
| 2012/0023584 A1 | 1/2012 | Yoo | |
| 2012/0036572 A1 | 2/2012 | Yoo | |
| 2012/0042375 A1 | 2/2012 | Yoo | |
| 2012/0117203 A1 | 5/2012 | Taylor et al. | |
| 2012/0222123 A1 | 8/2012 | Williams et al. | |
| 2013/0073388 A1 | 3/2013 | Heath | |
| 2014/0059226 A1 | 2/2014 | Messerli et al. | |
| 2014/0181894 A1 | 6/2014 | Bokern et al. | |
| 2014/0237550 A1 | 8/2014 | Anderson et al. | |
| 2014/0283071 A1 | 9/2014 | Spikes | |
| 2014/0337234 A1 | 11/2014 | Tang et al. | |
| 2015/0156183 A1 | 6/2015 | Beyer et al. | |
| 2015/0178497 A1 | 6/2015 | Lukacs et al. | |
| 2015/0271139 A1 | 9/2015 | Lukacs et al. | |
| 2015/0332043 A1 | 11/2015 | Russello | |
| 2016/0323315 A1 | 11/2016 | Hathaway et al. | |
| 2017/0068676 A1* | 3/2017 | Jayachandran | G06F 16/125 |
| 2017/0177877 A1 | 6/2017 | Suarez et al. | |
| 2017/0244748 A1 | 8/2017 | Krause et al. | |

OTHER PUBLICATIONS

Mattetti, Massimiliano et al. Securing the infrastructure and the workloads of linux containers. 2015 IEEE Conference on Communications and Network Security (CNS). https://ieeexplore.ieee.org/stamp/stamp.jsp?tp=&arnumber=7346869 (Year: 2015).*

Pan, Wei et al. Robust Container Code Recognition System. Fifth World Congress on Intelligent Control and Automation. https://ieeexplore.ieee.org/stamp/stamp.jsp?tp=&arnumber=1342264 (Year: 2004).*

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.

Cziva, et al., "Container-based Network Function Virtualization for Software-Defined Networks," 2015 IEEE Symposium on Computers and Communication (ISCC), pp. 415-420, Scotland.

Dhakchianandan, et al., "Memory Efficacious Pattern Matching Intrusion Detection System", 2013 International Conference on Recent Trends in Information Technology (ICRTIT), pp. 652-656, Anna University, Chennai, India.

Guenane, et al, "Autonomous Architecture for Managing Firewalling Cloud-Based Service," 2014 International Conference and Workshop on the Network of the Future (NOF), Paris, France, pp. 1-5.

Rehak, et al., "Adaptive Multiagent System for Network Traffic Monitoring," IEEE Intelligent Systems, vol. 24, Issue: 3, 2009, Czechia, pp. 17-25.

Shouman, et al., "Surviving Cyber Warfare With a Hybrid Multiagent-based Intrusion Prevention System," IEEE Potentials, vol. 29, Issue: 1, 2010, pp. 32-40.

Song, et al., "A Control Theoretical Approach for Flow Control to Mitigate Bandwidth Attacks," 2006 IEEE Information Assurance Workshop, West Point, NY, pp. 348-360.

Van Niekerk, et al., "Cloud-Based Security Mechanisms for Critical Information Infrastructure Protection," 2013 International Conference on Adaptive Science and Technology, South Africa, pp. 1-4.

(56) References Cited

OTHER PUBLICATIONS

Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.

Zhauniarovich, et al., "Moses: Supporting and Enforcing Security Profiles on Smartphones," IEEE Transactions on Dependable and Secure Computing, vol. 11, Issue: 3, pp. 211-223, 2014.

Azkia, et al., "Reconciling IHE-ATNA Profile with a posteriori Contectual Access and Usage Control Policy in Healthcare Environment", 2010 Sixth International Conference on Information Assurance and Security, 2010 IEEE, pp. 197-203, Cesson, Sevigne, France.

Skillen, et al., "Mobiflage: Deniable Storage Encryption for Mobile Devices," IEEE Transaction on Dependable and Secure Computing, vol. 11, No. 3, May-Jun. 2014, 2013 IEEE, pp. 224-237, Canada.

\* cited by examiner

| Field | Parameters |
|---|---|
| Metadata<br>410 | <ID>, <Creation_Time>' <Last_Update> |
| System Calls<br>420 | <syscall$_1$>, ...., <syscall$_k$> |
| Spawned Processes<br>430 | <process_name$_1$; signature>, ..., <process_name$_p$; signature> |
| Permissible Network Actions<br>440 | <Net_action$_1$>,...., <Net_action$_r$> |
| Permissible filesystem Actions<br>450 | <fs_action$_1$>,...., <fs_action$_r$> |
| | |

PROFILING OF CONTAINER IMAGES AND ENFORCING SECURITY POLICIES RESPECTIVE THEREOF

CROSS-REFERENCE TO RELATED APPLICATIONS

This patent application claims priority from U.S. Provisional Patent Application No. 62/274,420 filed on Jan. 4, 2016, and U.S. Provisional Patent Application No. 62/274,798 filed on Jan. 5, 2016. This patent application is also a continuation-in-part (CIP) application of:

a) U.S. patent application Ser. No. 15/278,700 filed on Sep. 28, 2016, which claims priority from U.S. Provisional Patent Application No. 62/235,644 filed on Oct. 1, 2015, and U.S. Provisional Patent Application No. 62/235,641 filed on Oct. 1, 2015; and b) U.S. patent application Ser. No. 15/292,915 filed on Oct. 13, 2016, which claims priority from U.S. Provisional Patent Application No. 62/241,812 filed Oct. 15, 2015. The contents of the above-referenced applications are hereby incorporated by reference.

TECHNICAL FIELD

The present disclosure generally relates to cybersecurity systems, and more particularly to profiling software containers and detecting malicious activity by software containers based on their respective profiles.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. A Docker is one popular existing platform for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

As demonstrated in FIG. 1, a number of software containers (i.e., the app containers 110-1 through 110-n, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-q (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function. All layers 215 and the base image 210 are collectively referred to a "container image").

The base image 210 (and its layers 215) can be shared across different software containers. Thus, only the container layer 220 differentiates between one software container and another. The container layer 220 is a readable and writable layer where all data written to the software container 200 is saved in the container layer 220. When the software container 200 is deleted, the writable container layer 220 is also deleted, and the base image 210 remains unchanged. As such, the software container 200 and other software containers (not shown) can share access to the same base image 210, where each software container has its own data state. In the example demonstrated in FIG. 2, the software container 200 is a Docker container (e.g., compliant with the Docker platform).

The popularity of software containers has been increased due to the easy integration with cloud-computing platform (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Container images are typically uploaded and stored in image registries that may or may not be managed by an organization. Further, the base images are used across many container images. As such, base images can be developed and uploaded to image registries by programmers who are associated with the organization seeking to use the image. Therefore, hackers can take advantage of program images to include malicious code. Thus, such images can be vulnerable when integrated in a software container. Such malicious code may carry any type of malware including, for example, computer viruses, worms, Trojan horses, ransomware, spyware, adware, scareware, and the like. Further, such malicious code may be a source for an ATP attack or a distributed denial of service (DDoS) attack when a software container is executed with an infected or malicious image.

To limit the risk associated with container images stored in registries, serval security and/or auditing processes can be performed prior to uploading a container image in a register. However, such processes are very limited in the type of vulnerabilities that they can check. Further, a container image determined to be safe can be later modified by a hacker (or an innocent programmer) to include code that can harm the execution environment.

Typically, a software container (and, thus, each application) can be secured separately from other software containers (and applications) during runtime execution. Thus, one software container cannot access resources of other software containers. However, the isolation of software containers cannot prevent the execution of malicious code. Malicious activity by software containers can occur through exploitation of legitimate programs or services in a container and improper configuration. Improper configuration may result in, for example, privilege escalations. Detection of such vulnerabilities occurs only at runtime, i.e., during the execution of the software containers.

Existing security solutions are not designed to detect vulnerabilities in images of software containers. Specifically, images have a specific structure that cannot be processed by existing security solutions. Further, existing solutions cannot determine or predict how the container image (being a static file) would behave when it is being executed. For example, a conventional antivirus tool cannot scan container images to detect, for example, if an executable process has been modified. As another example, an antivirus tool cannot determine a system call that a process in a container image would trigger when the process is executed.

As another example, exploitation of legitimate programs may include utilization of named objects created by such programs to perform malicious activity. Typically, a named object can be used for inter-process communication, process synchronization, and the like. Malware, for example, can be programmed to preemptively create a named object before a legitimate program could create one. The malware can exploit the created object to propagate malicious code. Detection of such vulnerabilities occur at runtime only, i.e., during the execution of the software containers.

It would therefore be therefore advantageous to provide a solution that would secure the execution of software containers.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for securing execution of software containers using security profiles. The method comprises receiving an event indicating that a container image requires profiling, wherein the container image includes resources utilized to execute a corresponding application container; generating a security profile for the container image, wherein the generated security profile includes at least a system calls profile; monitoring the operation of a runtime execution of the application container; and detecting a violation of the security profile based on the monitored operation, wherein the security profile is of the container image corresponding to the application container.

Some embodiments disclosed herein also include a host device for securing execution of software containers using security profiles. The system comprises a processing system; and a memory, the memory containing instructions that, when executed by the processing system, configure the host device to: receive an event indicating that a container image requires profiling, wherein the container image includes resources utilized to execute a corresponding application container; generate a security profile for each of the least one container image, wherein the generated security profile includes at least a system calls profile; monitor the operation of a runtime execution of the application container; and detect a violation of the security profile based on the monitored operation, wherein the security profile is of the container image corresponding to the application container.

Some embodiments disclosed herein also include a method for generating a whitelist of system calls of application containers. The method comprises receiving an event indicating that a container image requires profiling, wherein the container image includes resources utilized to execute a corresponding application container; scanning contents of the container image to identify programs; detecting callable units in each identified programs; mapping each detected callable unit in the identified programs to at least one system call; and saving the mapped system calls as a whitelist in the security profile.

Some embodiments disclosed herein also include a host device for generating for generating a whitelist of system calls of application containers. The host device comprises a processing system; and a memory, the memory containing instructions that, when executed by the processing system, configure the host device to: receive an event indicating that a container image requires profiling, wherein the container image includes resources utilized to execute a corresponding application container; scan contents of the container image to identify programs; detect callable units in each identified program; map each detected callable unit in the identify programs to at least one system call; and save the mapped system calls as a whitelist in the security profile.

Some embodiments disclosed herein also include a method for securing execution of software containers using security profiles. The method comprises receiving an event indicating that a container image requires profiling, wherein the container image includes resources utilized to execute a corresponding application container; generating a security profile for the container image; monitoring the operation of a runtime execution of the application container; and detecting a violation of the security profile based on the monitored operation, wherein the security profile is of the container image corresponding to the application container.

Some embodiments disclosed herein also include a host device for host device for securing execution of software containers using security profiles. The system comprises a processing system; and a memory, the memory containing instructions that, when executed by the processing system, configure the host device to: receive an event indicating that a container image requires profiling, wherein the container image includes resources utilized to execute a corresponding application container; generate a security profile for each of the least one container image; monitor the operation of a runtime execution of the application container; and detect a violation of the security profile based on the monitored operation, wherein the security profile is of the container image corresponding to the application container.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

FIG. 4 is a diagram of a security profile generated according to an embodiment.

DETAILED DESCRIPTION

Figure 1:
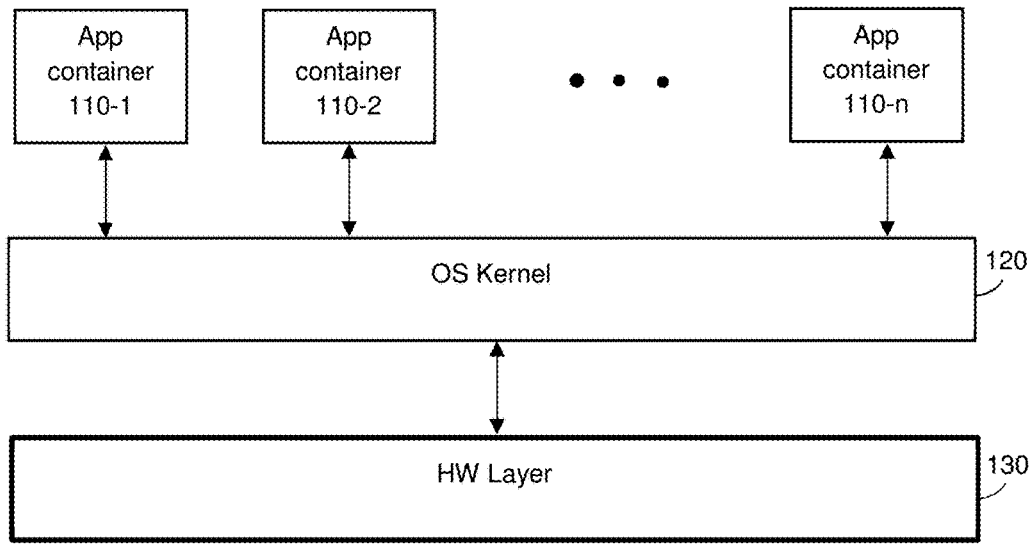
FIG. 1 is a diagram illustrating of execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include a method and system for profiling container images to result in a security profile for each container image. The profiling is performed through static analysis of all layers in a container image. That is, the profiling of container images is performed prior to runtime of a container. A generated security profile includes safe actions, authorized actions, or both, to be performed by the respective application (APP) container when executed. In an embodiment, a security profile may include at least one of: a list of allowed (whitelist) system calls, a list of permissible network actions, a list of permissible filesystem actions, and signatures of executable files of spawned processes.

The execution of an APP container corresponding to a profile container image is monitored to enforce the respective security profile. A container image is a static file and a runtime instance of the container image is a software container executing a specific application (hereinafter "APP container"). In an embodiment, the enforcement includes detection of any breach of the security profile based on a security policy. The various embodiments will be discussed in greater detail below.

Figure 3:
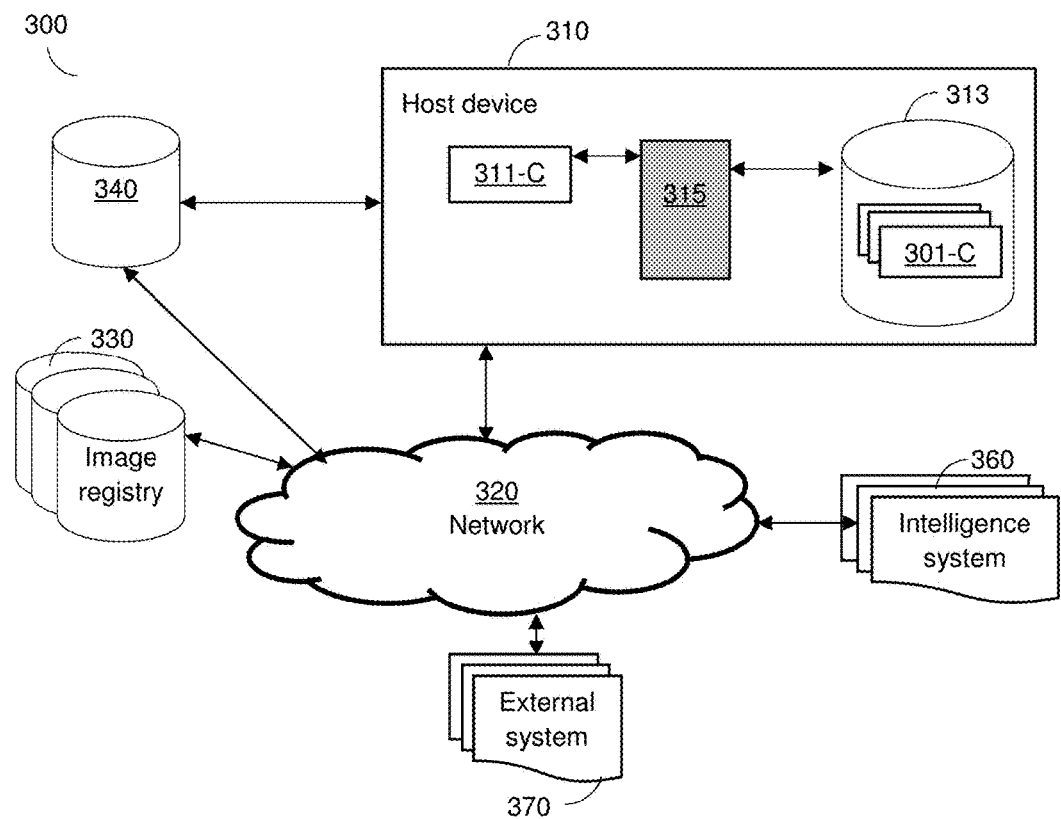
FIG. 3 is a network diagram utilized to describe the various disclosed embodiments.

FIG. 3 is an example network diagram 300 utilized to describe the various disclosed embodiments. A host device 310 is communicatively connected to a network 320. The host device 310 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

Figure 2:
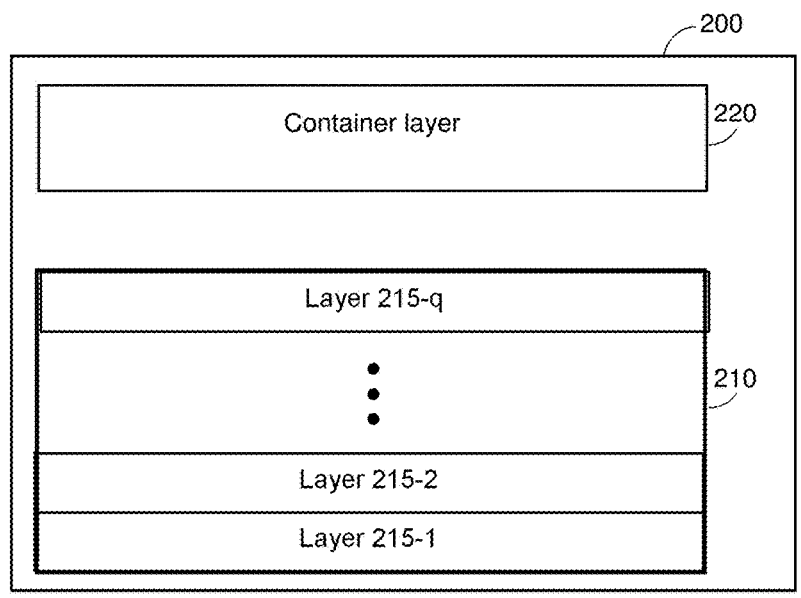
FIG. 2 is a diagram illustrating a structure of a software container.

Also connected to the network 320 is one or more image registries 330 (collectively referred to hereinafter as image registries 330 and individually as an image registry 330, merely for simplicity purposes). Each image registry 330 stores container images (not shown) that can be imported and executed on the host device 310. An example container image is shown in FIG. 2.

An image registry 330 may be, but is not limited to, Docker Hub, Google Container Registry, Amazon EC2 Container Registry, Artifactory, and the like. The image registry 330 is a data repository that allows programming and testing of container images. An image registry 330 typically provides a centralized resource for discovery, distribution, management, and collaboration of base images. An image registry 330 may be a cloud-based registry service or may be on-premises. In certain configurations, container images can be locally stored at the host device 310, e.g., in a registry 313.

According to the disclosed embodiments, the host device 310 is configured to host and execute a detector container 315. The detector container 315 is a software container designed to profile container images stored in the registries 330 and to enforce a secured execution of a respective APP container based on the generated profiles. For example, a registry 313 includes a container image 301-C, where the runtime instance of this image is a APP container 311-C.

In an embodiment, the host device 310 (and the detector container 315) are configured to interface with a continuous integration (CI) system (not shown). Typically, a CI system allows for building, testing, and uploading of container images to the image registries 330. Examples for such a CI system include Jenkins®, Appveyor®, TeamCity, Bamboo, and the like. In an example embodiment, the interface between the host device 310 and the system may be realized as an API or a plugin. The host device 310 may also be communicatively connected to a database 340 storing generated security profiles, polices, and data utilized to profile the container images.

In an optional deployment, the host device 310 is communicatively connected to one or more intelligence systems 360 through the network 320. The intelligence systems 360 may include common vulnerabilities and exposures (CVE®) databases, reputation services, security systems (providing feeds on discovered threats), and so on. The information provided by the intelligence systems 360 is utilized to detect certain vulnerabilities, to profile the container images, or both.

The host device 310 may be communicatively connected to one or more external systems 370 through the network 320. Examples for such external systems 370 may include, but are not limited to, an active directory of an organization to retrieve user permissions, access control systems (e.g., Docker Swarm, and Kubernetes management plane), SIEM systems to report on detected vulnerabilities, audit and compliance systems, and the like.

According to the disclosed embodiments, the detector container 315 is configured to receive an event indicating that a container image in one of the image registries 330 has been changed or added. The event includes at least a source of the image (e.g., a registry's network address or a check-in system) and an identifier of the container image to be checked. In some embodiments, the event may be generated by the host device 310 when a new base image is uploaded to the host or when an image locally stored in the host device 310 is modified. As discussed above, the container image includes a container layer (e.g., the layer 210, FIG. 2) which sets the application executed by a container and a plurality of image layers (e.g., the layers 215, FIG. 2), each of which is uniquely identified. Each container image may be assigned with a unique identifier, which may be computed as a check-sum or hash value computed over the contents of the layer.

In an embodiment, upon receiving an event, the respective container image is downloaded to the host device 310 (e.g., a container image 301-C) and a security profile is generated for the container image. A profile is generated through static analysis of the various layers, that is, without execution of the container image. The profiling process will be discussed with reference to the container 301-C. In an optional embodiment, the container image 301-C is reformatted into a data structure that can be processed. For example, the container image 301-C may be reformatted to be, but is not limited to, a file having a standard format, a TAR (Tape ARchive) file, and the like.

In one embodiment, a generated security profile includes safe actions, authorized actions, or both, to be performed by the respective software (e.g., the container 311-C). The security profile may include, but is not limited to, a list of allowed system calls, a list of permissible network actions, a list of permissible filesystem actions, signatures of executable files of spawned processes, or a combination thereof. It should be appreciated a complete profiling including all of such lists would ensure better protection with less false positives.

According to the disclosed embodiments, the detector container 315 is configured to analyze the container image 301-C to identify programs written in any scripting language (e.g., Python, Ruby, JavaScript, etc.) or programming language (e.g., C, C+, Java, etc.). For each identified program (or a piece of code), the detector container 315 is configured to identify calls to procedures (e.g., methods, functions, routine, etc.). Such calls are collectively referred to hereinafter as "callable units" or a "callable unit". In computer programming, a callable unit packages a sequence of program instructions that perform a specific task. A callable unit (e.g., a method in Java) has a unique name and may be called with a set of input parameters and output parameters. For example, querystring.escape(str) is a node.js method that performs URL percent-encoding on the given input string (str) in a manner that is optimized for the specific requirements of URL query strings. As another example, the process.getgid( ) is a node.js method that returns the numerical group identity of the process.

In another embodiment, the detector container 315 is configured to determine the runtime process that would execute the identified code. Examples for such processes include node.js, mongod, httpd, and the like. It should be appreciated each runtime process would have different callable units.

Upon detecting callable units in the container image 301-C, each such callable unit is mapped to one or more system calls. The mapping is performed using a preconfigured mapping table stored, for example, in the database 340. In an embodiment, the mapping table includes, for each runtime process (and its version), a list of callable units. Each callable unit includes one or more matching system calls for each type of OS (e.g., Linux, Windows®, etc.). The mapping table can be updated upon release of new runtime process version and/or operating system. The mapping table can be updated when vulnerable system calls are reported. For example, a table that initially includes a mapping to a Linux system call "chdir". This system call would be removed from the table if reported as vulnerable. In an embodiment, the vulnerable system calls are not included in the mapping table. Table 1 demonstrates an example mapping table for mapping between some node.js callable units and some Linux system calls.

TABLE 1

| Callable unit | System call |
|---|---|
| process.getgid( ) | "brk","access","mmap","open","stat","fstat","close", "read" |
| require.reslove( ) | "mprotect","arch_prctl","munmap","set_tid_address","set_robust_list","rt_sigaction", "rt_sigprocmask","getrlimit","pipe2","write","futex","clock_getres", |
| eventEmitter.on( ) | "brk","access","mmap","open","stat","fstat","close","read","mprotect","arch_prctl" |

It should be noted that the system calls listed in the mapping table are likely to be called when the respective callable unit is executed. For example, running the callable unit require.reslove( ) would trigger the system call "mprotect" (which specifies the desired protection for the memory pages).

The profile of a container image would include the system calls mapped to its callable units. That is, for example, if the image 301-C includes the callable units process.getgid( ); require.reslove( ); and eventEmitter.on( ), the secuirty profile of the image 301-C would include all the system calls listed in Table 1.

It should be noted that mapping table is utilized by the detector container 315 when processing any of the container images. However, different container images would like to have different mapping (a list of system calls) as they are programmed differently.

In another embodiment, the detector container 315 is configured to profile spawned process(es) executed at runtime. Typically, an APP container (e.g., the APP container 311-C) runs a single process when it is launched. In order to run more than one process in an APP container, a script is programmed as the entry-point for the container. Such an entry-pint script includes commands to execute two or more process (also referred to as spawned processes). Each spawned process may be any process that can be executed in an APP container, such as apache2, mongod, httpd, mysql, and the like, or any other process programmed by the container's developer.

In an embodiment, the detector container 315 is configured to parse the entry-point script to identify spawned process(es) designated therein. Then, the executable file of each such spawned process is searched in the container image 301-C. The detector container 315 is configured to create a unique signature for each executable file. The signature may be computed as a check-sum or hash value computed using a hash function over the contents of the executable file. Each generated signature is saved with the security profile of the container image 301-C together with the name of the respective spawned process.

It should be noted that different security profiles for different container images would include different signatures, as each container would execute different spawned processes, and their executable files would be different.

In another embodiment, the detector container 315 is configured to profile the network actions (activity) permissible by the container image 301-C. The permissible network actions are determined based on the context of the application executing the container. Each such action defines which network resources can be accessed by the APP container during runtime and which network resources can be access the APP container during runtime. A network resource may include an IP address, a URL, a domain, a connection port, an inbound connection, an outbound connection, and so on.

In an embodiment, such resources and, thus, permissible network actions are determined based on an analysis of the network configuration files saved in the container image 301-C. In another embodiment, such resources and, thus, permissible network actions are determined based on the analysis of processes to be executed by the APP container (311-C) of the respective container image 301-C. For example, if a process "myCode" includes an instruction to open a port number 443, the security profile of the container image 301-C would designate "open port number 443" as a permissible network action.

In another embodiment, the detector container 315 is configured to profile filesystem actions permissible by the container image 301-C. Such permissible filesystem actions may also be determined based on the context of the application executed the APP container. Each such action defines which filesystem resources can be accessed by the APP container during runtime. A filesystem resource may include a file, a directory, a sub directory, a memory page, a cache section, and so on.

In an embodiment, such resources and, thus, permissible filesystem actions, are determined based on an analysis of processes to be executed by the APP container (311-C) of the respective container image 301-C. For example, if a process "myCode" includes an instruction to write to a directory "myFiles", the security profile of the container image 301-C would designate "write to myFiles" as a permissible network action.

An example diagram of a security profile 400 is illustrated in FIG. 4. The metadata field 410 includes the container image unique identifier <ID>, profile creation time <Creation_Time>, and last update time <Last_Update>. The system calls field 420 lists the system calls <syscall> that can be triggered at runtime. The spawned processes field 430 includes the signature and name each spawned process(es) executed at runtime by the APP container <process_name$_1$; signature>. The process name is identified in the executable file header. The permissible network actions field 440 includes a list of permissible network actions <Net_action>. The permissible filesystem actions field 450 includes the permissible filesystem actions <fs_action>. The security profile 400 may be saved in the database 340 and indexed using the container image identifier.

It should be noted that the security profile 400 depicts example fields and values, and that other fields may be included in the profile without departing from the scope of the disclosure. In an embodiment, the creation data and last update values may define if the security policy is invalid (i.e., when the contents of the profile are too old).

Returning to FIG. 3, in an embodiment, prior to generating a new security profile for a container image 311, it is checked, using its identifier, if a security policy was already generated for that container image. If so, the profiling process is configured to update the contents of such a profile.

As noted above, the generation and updating of a security process is performed as an offline process, that is, prior to executing the respective APP container. In some embodiments, an update of a security profile can be performed at runtime during a predefined learning period (e.g., 1 hour after a first launch of the container). During the learning period, the detector container 315 is configured to monitor the operation of the container image 311-C to detect any triggered system calls, executed processes, network actions, filesystem actions, or a combination thereof. The monitored operations during the learning period are considered safe and added to the profile.

In an embodiment, the detector container 315 is configured to enforce the security profiles based on a security policy. The security policy may define the mitigation action to be performed upon detection of a breach, the severity of each breach, whether or not a security profile should be completed in order to enforce or launch a container, a combination thereof, and the like. A security policy may be defined individually for each container image or for a group of container images.

In an embodiment, enforcement of a security policy generated for a container is executed in the host 310. For example, execution of the APP container 311-C from the container image 301-C. To this end, the detector container 315 is configured to monitor events (or system calls) indicative of instantiation, running, or both, of a new APP container (e.g., the container 311-C). The execution of an APP container 311-C is monitored by intercepting any communication in to or out of an APP container 311-C. To this end, the detector container 315 may act as a proxy to the APP container 311-C.

For example, in a Docker architecture, the detector container 315 may proxy any communication between the client and daemon programs of an APP container 311. The intercepted communications may include, for example, system calls, access to the filesystem, access to network resource, execution of processes, and so on. Each intercepted communication is analyzed to detect an attempt by the APP container 311-C to violate any parameter sets in the security profile generated for the container image 301-C.

Specifically, any system call triggered by the execution of the APP container 311-C is captured and compared to the allowable system calls defined in the respective profile. For example, assuming that the security profile is generated for the container image 301-C, while the security profile lists the system call "close", there is no violation of the profile. If the captured system call "chdir" is not included in the profile, a violation of the profile is determined.

Furthermore, any attempt to execute a spawned process during the runtime of the APP container 311-C is captured. Any execution of a new spawned process is reported to the detector container 315 as, for example, a netlink event. Such an event includes the process name and a pointer to the executable file. A signature is generated over the contents of the executable file using the same hash or check-sum functions used for the profiling. The generated signature is comparted to a signature of the respective spawned process as saved in the security profile. If the signatures are the same, there is no violation of the profile; otherwise, a violation of the profile is determined as that the spawned process has been modified (e.g., by injecting malware code). In another embodiment, when the spawned process's name to be executed is not designated in the profile, then this is also a violation of the profile.

Enforcement of network and filesystem actions is performed in a similar fashion. That is, any network action or filesystem action that is attempted to be performed during the runtime of the APP container 311-C is captured and compared against the permissible actions as defined in the security profile. For example, an attempt to access a directory not defined as a permissible action would be considered as a violation of the security profile.

Upon detecting a violation of the security profile, an enforcement (or mitigation) action is performed. In an embodiment, the enforcement action to be taken is defined in the security profile. An enforcement action may include generating an alert, halting the operation of the APP container, halting or disabling the execution of a process, quarantining the APP container or the infected file, and so on.

The enforcement action may be defined for any parameter or field in the security profiling. For example, an attempt to trigger a system call chdir (not defined in the profile) would generate an alert. However, an attempt to trigger a system call keyctl (not defined in the profile) would halt the operation of the APP container. The keyctl system call is known to be vulnerable. In an embodiment, halting an operation of an APP container is performed by the OS kernel. To this end, the detector container 315 may use the system call seccom. As another example, any violation of a permissible network action would be reported, but a violation of a permissible network action would halt the APP container's execution. A security policy may be defined by a user (e.g., a system administrator) based on the application context of an APP container, the deployment environment, and so on.

In an embodiment, execution of an APP container (e.g., the APP container 311-C) may be performed in a quarantined environment, thereby protecting the host device 310. This embodiment is further discussed in the U.S. patent application Ser. No. 15/278,700, assigned to the common assignee, the contents of which are hereby incorporated by reference.

Figure 5:
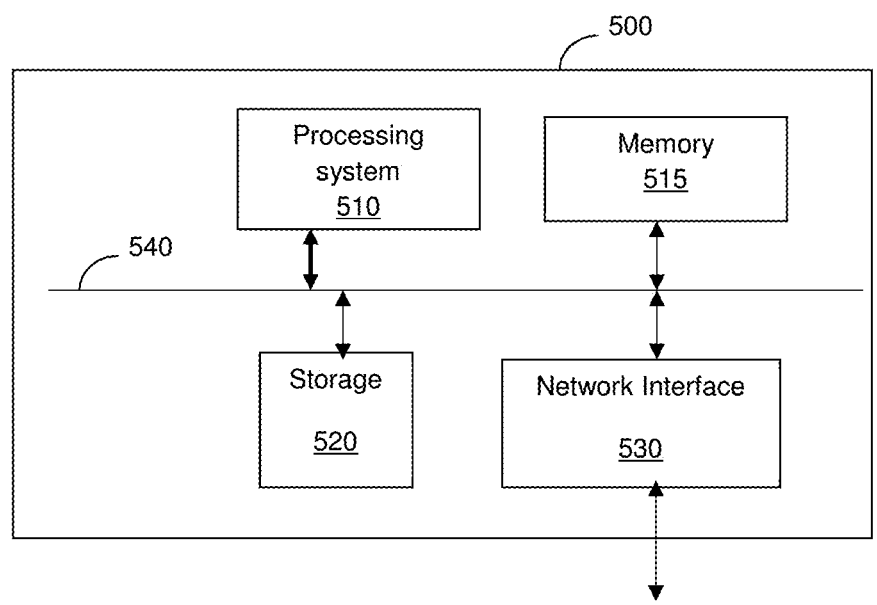
FIG. 5 is a block diagram of a hardware layer in host devices utilized to execute at least a detector container according to an embodiment.

It should be appreciated that the host device requires an underlying hardware layer to execute the OS, VMs, and software (APP) containers. An example block diagram of a hardware layer 500 is shown in FIG. 5. The hardware layer 500 includes a processing system 510, a memory 515, a storage 520, and a network interface 530, all connected to a computer bus 540.

The processing system 510 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more embodiments disclosed herein may be stored in the storage. The storage may also store other computer readable instructions to implement an operating system, an application program, and the like. Computer readable instructions may be loaded in the memory for execution by the processing system 510.

In another embodiment, the storage 520, the memory 515, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing system 510, cause the processing system 510 to perform the various functions described herein with respect to at least profiling container images and enforcing secured execution of their respective APP containers based on the profiles.

The network interface 530 allows communication with other external systems or host devices through a network (e.g., the network 320). The network interface 530 may include a wired connection or a wireless connection. The network interface 530 may transmit communication media, receive communication media, or both. The computer bus 540 may be, for example, a PCIe bus.

Figure 6:
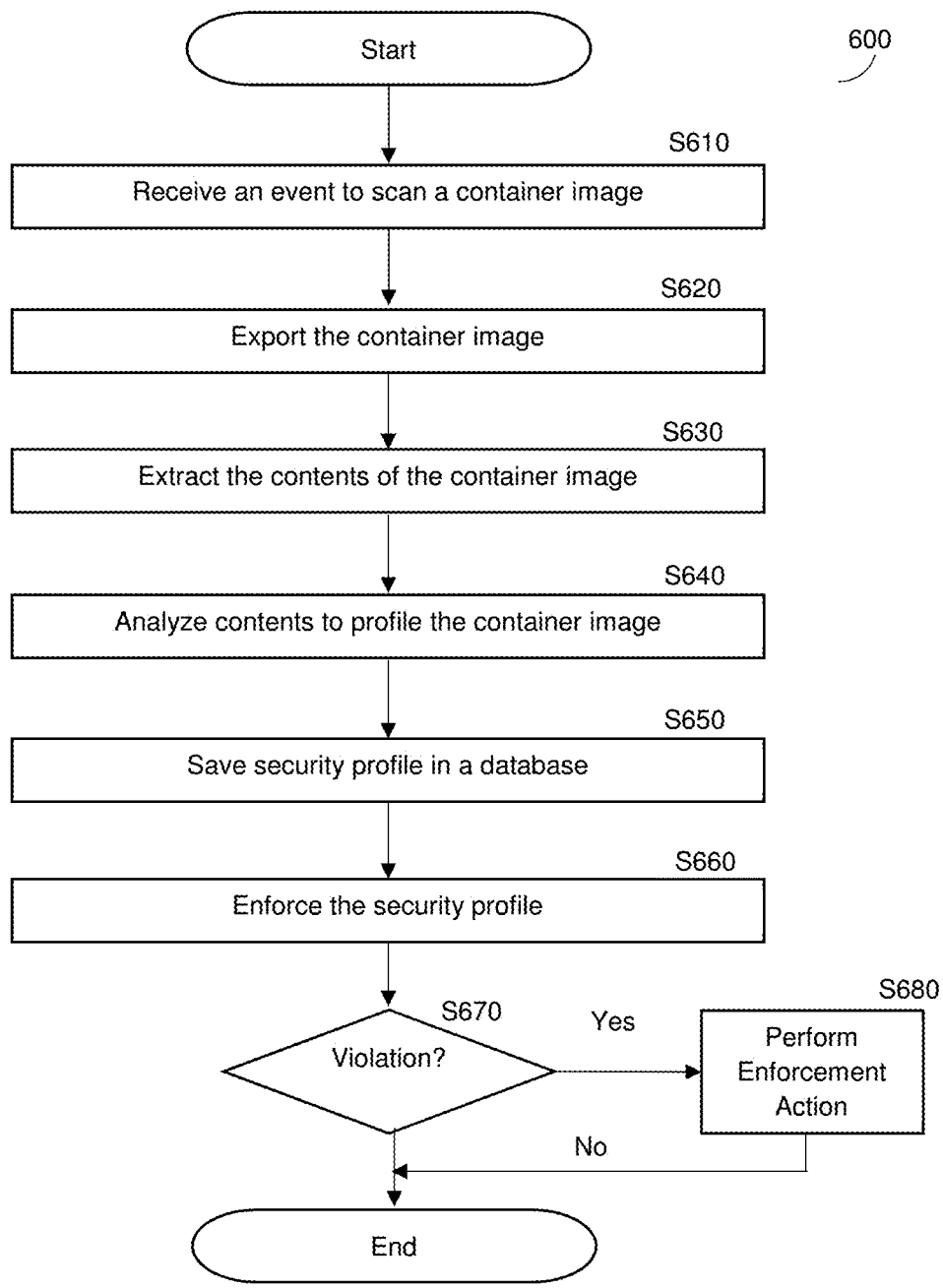
FIG. 6 is a flowchart illustrating a method for profiling container images and enforcing secured execution of the respective APP containers according to an embodiment.

FIG. 6 shows an example flowchart 600 illustrating a method for profiling container images and enforcing secured execution of the respective APP containers according to an embodiment.

At S610, an event indicating that a container image should be scanned is received. Such an event can be received from a continuous integration system, an image registry, and the like. The event may designate a specific container image or a group of images (each of which identified by their unique identifier) and the source of the image(s) to be scanned. For sake of simplicity of the discussion, the example flowchart 600 is discussed with respect to receiving a single event of single container image and enforcing a single corresponding APP container. It should be noted that additional events may be received without departing from the scope of the disclosure. Further, multiple container images and APP containers can be processed in parallel.

At S620, the container image (e.g., the container image 301-C, FIG. 3) to be scanned is exported from its source to the device hosting the detector container. It should be emphasized that exporting the container image does not require executing the image on the host device.

At optional S630, the contents of the container image are extracted. Specifically, the contents of each layer in the container image may be extracted. In an embodiment, the extraction includes reformatting the container image into a data structure that can be processed.

At S640, the contents of the container image are analyzed to generate a new security profile. In an embodiment, S640 includes updating an existing security profile. As discussed above, the security profile is generated to include at least a list of allowed system calls, a list of permissible network actions, a list of permissible filesystem actions, signatures of executable processes, or a combination thereof. An example security profile is described further herein above with respect to FIG. 4. The various embodiments to profile a container image are discussed above and further demonstrated in FIGS. 7 and 8.

At S650, the new or updated security profile is saved in a database indexed based on the respective container image identifier. The profiling of a container image is typically performed prior to runtime. As noted above, a generated security profile can also be updated at runtime during a predefined learning period.

At S660, the method transitions to an enforcement mode, upon receiving an event indicative of instantiation, running, or both, of a new APP container. An APP container (e.g., the APP container 311-C. FIG. 3) is a runtime instance of a corresponding container image (e.g., the container image 301-C, FIG. 3). In an embodiment, S660 includes retrieving the respective security profile; intercepting any communications to and from the APP container; analyzing the intercepted communication to detect an attempt by the APP container to violate any parameter sets in the retrieved security profile. The analysis may include comparing any intercepted communication to the parameters defined the security profile. Various embodiments and examples for analyzing the intercepted communication against the profile are provided above.

At S670, it is checked if the retrieved security profile has been violated and, if so, execution continues with S680, where an enforcement action is performed. Otherwise, execution terminates.

As discussed above, the enforcement action may be determined based on a security policy, the type of the detected violation, or both. The endorsement action may include, for example, generating an alert (or security event), halting the operation of the APP container, quarantining the APP container or the infected file, and so on. The alert may include APP container identifier, a name of the infected process, information of the detected violation, and so on. The enforcement of the security policy is performed at runtime.

Figure 7:
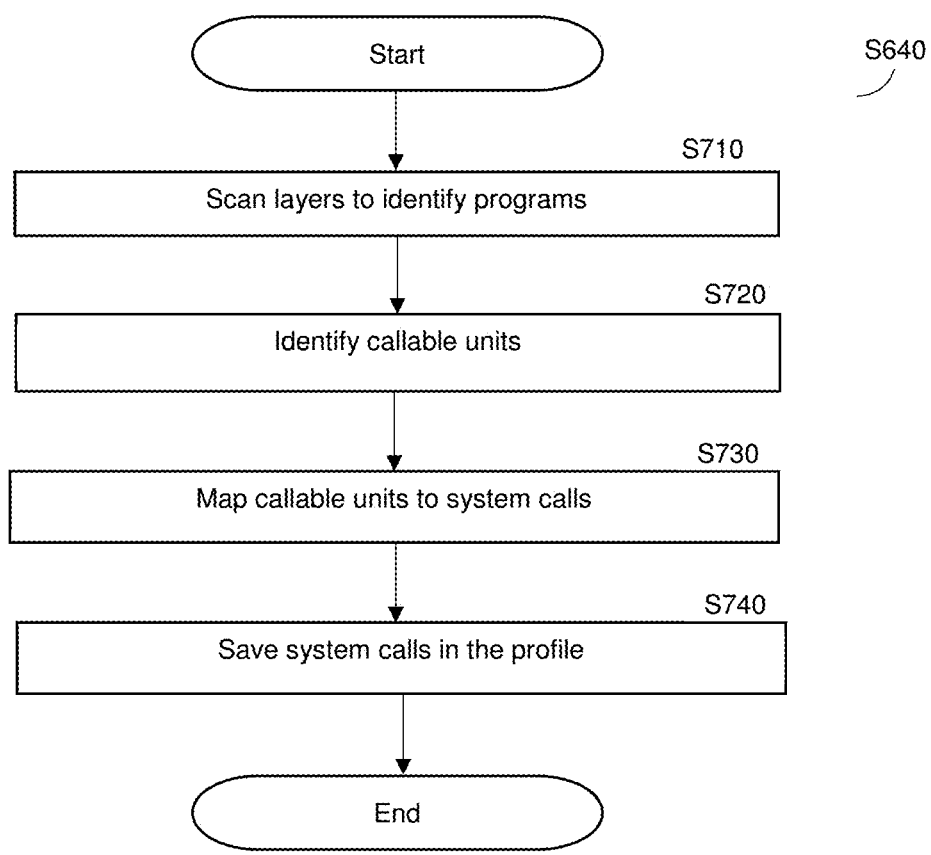
FIG. 7 is a flowchart illustrating a method for system calls profiling according to an embodiment.

FIG. 7 shows an example flowchart S640 illustrating system calls profiling according to an embodiment. At S710, the contents of the container image (received at S620) are scanned to identify programs (or pieces of code). The program can be coded in any programing language, scripting language, or combination thereof. The scan may be performed across all layers of the container image.

At S720, each identified program is further scanned to identify a callable unit. In computer programming, a callable unit packages a sequence of program instructions that perform a specific task. A callable unit (e.g., a method in Java) has a unique name and may be called with a set of input parameters and output parameters.

At S730, each identified callable unit is mapped to a system call. The system call is likely to be triggered upon runtime execution of the callable unit. In an embodiment, the mapping is performed using a mapping table. The mapping table includes, for each runtime process (and its version), a list of callable calls. Each callable unit includes one or more matching system calls for each type of OS (e.g., Linux, Windows®, etc.). The mapping table can be updated upon release of a new runtime process version or operating system. An example mapping table is shown as Table 1, discussed herein above.

At S740, the mapped system calls are saved in the security profile in the system calls field. It should be noted that different container images may have different system call profiles, although their profiling is performed using the same mapping table.

Figure 8:
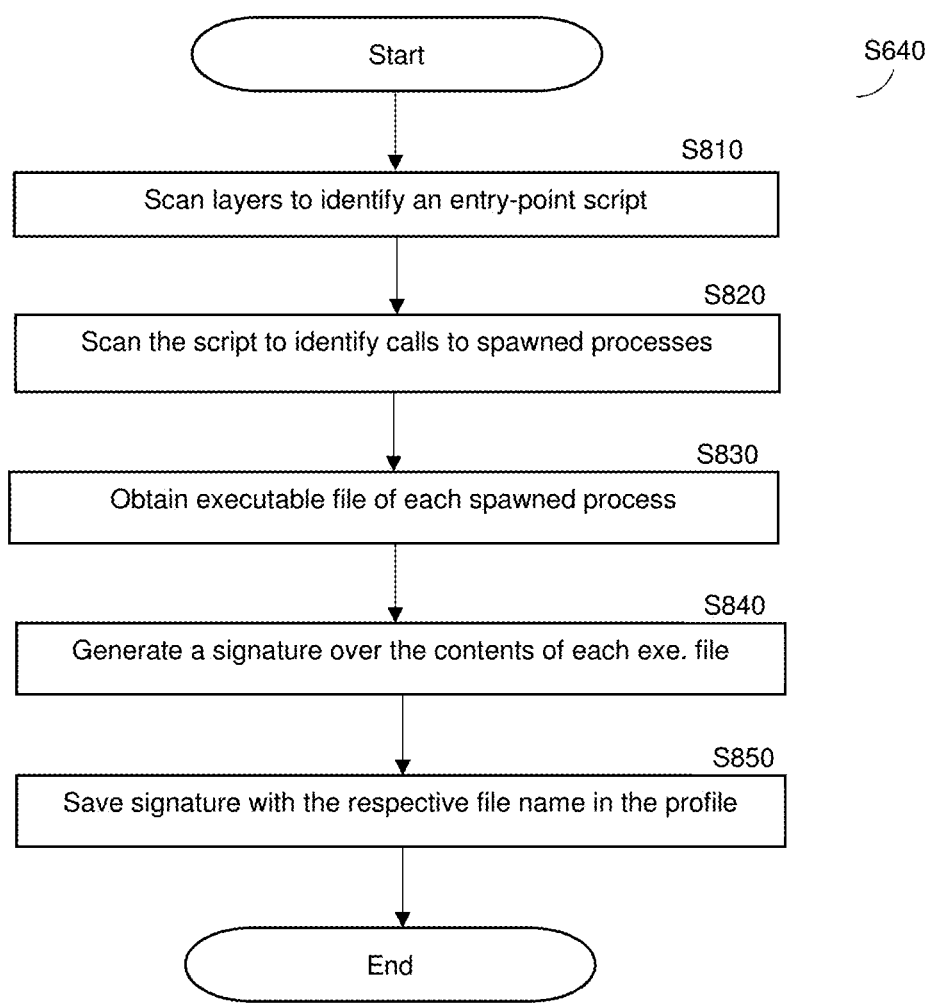
FIG. 8 is a flowchart illustrating a method for spawned processes profiling according to an embodiment.

FIG. 8 shows an example flowchart S640 illustrating spawned processes profiling according to an embodiment. At S810, the contents (i.e., the layers) of the container image (received at S620) are scanned to identify an entry-point script. Such a script is the first to launch upon execution of an APP container and lists all the spawned processes to be executed. The scan may be performed across all layers of the container image.

At S820, the entry-point script is scanned to identify the name of each spawned process listed therein. The following is an example for entry-point script (myscript) as executed in a Docker environment:

$ docker run -p 22-p 80-t -i myscript
CRIT Supervisor running as root
INFO supervisord started with pid 1
INFO spawned: 'mongod' with pid 6
INFO spawned: 'apache2' with pid 7

Where, 'supervisord' is a main process executing the entry-point script and 'mongod' and 'appche2' are the two spawned processes to be executed in the APP container, each of which is assigned with a different process ID (pid).

At S830, the executable file of each identified spawn process is obtained from their locations in the container image. Typically, the executable file includes a header designating the process name and its type. Thus, the image can be scanned to detect the location of an expectable file.

At S840, a signature is generated for each executable file using, for example, a hash or check-sum process. The signature may be a binary number, a hexadecimal number, a string of characters, or any other format.

At S850, each signature is saved together with the respective spawned process name in the security profile in the spawned process field.

It should be noted that various embodiments have been discussed herein with a reference to software containers. A software container provides an executable environment with a complete filesystem. A software container may include a micro-service, a Docker container, a light virtual machine, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing execution of software containers using security profiles, comprising:
 receiving an event indicating that a first container image requires profiling, wherein the first container image includes resources utilized to execute a corresponding first application container;
 generating a security profile via static analysis of the first container image, wherein the generated security profile includes at least a system calls profile, wherein the static analysis occurs without execution of the first container image, wherein the system calls profile includes a first mapping between at least one callable unit of the first container image and at least one system call of the corresponding first application container, wherein the first mapping is different from each of at least one second mapping between at least one callable unit of at least one second container image and at least one system call of at least one second application container;
 monitoring the operation of a runtime execution of the first application container; and
 detecting a violation of the security profile based on the runtime execution of the first application container, wherein the security profile is of the first container image corresponding to the first application container.

2. The method of claim 1, wherein the event further indicates any one of: a new third container image is added to an image registry and the first container image in an image registry has been modified.

3. The method of claim 2, further comprising:
 exporting the first container image to a host device from the image registry; and
 generating the security profile for the first container image in the host device without executing the first container image on the host device.

4. The method of claim 1, wherein the system calls profile in the generated security profile includes a list of system calls permitted to be triggered at runtime by the corresponding first application container.

5. The method of claim 4, wherein generating the security profile further comprises:
 scanning contents of the first container image to identify programs;
 detecting callable units in each identified program;
 mapping each detected callable unit to at least one system call; and
 saving all mapped system calls in the security profile.

6. The method of claim 5, wherein the mapping of a callable unit to at least one system call is performed using a mapping table, wherein the mapping tables lists mapped system calls based on an operating system type, a process in which the program is identified, and a version of the process.

7. The method of claim 4, wherein the generated security profile further includes: a signature and a name of each spawned process executed by the first application container, a list of permissible network actions, and a list of permissible filesystem actions.

8. The method of claim 1, wherein generating the security profile further comprises:
 updating an existing security profile.

9. The method of claim 8, wherein the updating of the existing security profile is performed at runtime during a predefined learning period.

10. The method of claim 4, wherein monitoring the operation of the first application container further comprises:
 intercepting events sent to and from the first application container during a runtime execution of the first application container, wherein intercepted events include at least a trigger to a system call.

11. The method of claim 10, wherein detecting a violation of the security profile further comprises:
 comparting each intercepted system call to the system calls stored in the security profile; and
 determining a violation of the security profile when the intercepted system call does not match any of the system calls stored in the security profile.

12. The method of claim 11, further comprising:
 performing, at a runtime execution of the first application container, the at least one enforcement action, when a violation is detected, wherein the enforcement action is detected based in part on a security policy.

13. The method of claim 12, wherein the at least one enforcement action includes at least one of: generating an alert, halting the operation of the first application container, and quarantining the first application container.

14. The method of claim 1, further comprising:
 generating a security profile for each of the at least one second container image prior to runtime; and
 enforcing an execution of the first application container at runtime using the respective security profile of the first container image.

15. The method of claim 1, wherein the first container image is a static file, wherein the first application container is a runtime instance of a software container executing a specific application.

16. A non-transitory computer readable medium having stored thereon instructions that, when executed by a processing system, cause the processing system to execute the method of claim 1, wherein the instructions are executed by the processing system.

17. A method for generating a whitelist of system calls of application containers, comprising:
 receiving an event indicating that a first container image requires profiling, wherein the first container image includes resources utilized to execute a corresponding first application container;
 scanning contents of the first container image to identify programs;
 detecting callable units in each identified program;
 mapping each detected callable unit in the identified programs to at least one system call of a first application container; and
 saving the mapped system calls as a whitelist in a security profile, wherein the security profile includes a system calls profile, wherein the system calls profile includes a first mapping between the detected callable units and the respective mapped at least one system call, wherein the first mapping is different from each of at least one second mapping between at least one callable unit of at least one second container image and at least one system call of at least one second application container.

18. The method of claim 17, further comprising:
 exporting the first container image to a host device from the image registry; and
 generating the whitelist in the host device without executing the first container image on the host device.

19. The method of claim 17, further comprising:
monitoring, for a predefined learning period, a runtime execution of the first application container to detect triggered system calls; and
including each triggered system call in the whitelist.

20. The method of claim 17, wherein the mapping of a callable unit to at least one system call is performed using a mapping table, wherein each mapping table lists mapped system calls based on an operating system type, a process in which the programmed is identified, and a version of the process.

21. A non-transitory computer readable medium having stored thereon instructions that, when executed by a processing system, cause the processing system to execute the method of claim 17, wherein the instructions are executed by the processing system.

22. A method for securing execution of software containers using security profiles, comprising:
receiving an event indicating that a first container image requires profiling, wherein the first container image includes resources utilized to execute a corresponding first application container;
generating a security profile via static analysis of the first container image, wherein the static analysis occurs without execution of the first container image, wherein the security profile includes a system calls profile, wherein the system calls profile includes a first mapping between at least one callable unit of the first container image and at least one system call of the corresponding first application container, wherein the first mapping is different from each of at least one second mapping between at least one callable unit of at least one second container image and at least one system call of at least one second application container;
monitoring the operation of a runtime execution of the first application container; and
detecting a violation of the security profile based on the runtime execution of the first application container, wherein the security profile is of the first container image corresponding to the first application container.

23. The method of claim 22, wherein the generated security profile includes at least one of: a whitelist of system calls, a signature and a name of each spawned process executed by the first application container, a list of permissible network actions, and a list of permissible filesystem actions.

24. The method of claim 22, wherein the first container image is a static file, wherein the first application container is a runtime instance of a software container executing a specific application.

25. A non-transitory computer readable medium having stored thereon instructions that, when executed by a processing system, cause the processing system to execute the method of claim 22, wherein the instructions are executed by the processing system.

26. A host device for securing execution of software containers using security profiles, comprising:
a processing system; and
a memory, the memory containing instructions that, when executed by the processing system, configure the host device to:
receive an event indicating that a first container image requires profiling, wherein the first container image includes resources utilized to execute a corresponding first application container;
generate a security profile via static analysis of the first container image, wherein the generated security profile includes at least a system calls profile, wherein the static analysis occurs without execution of the first container image, wherein the system calls profile includes a first mapping between at least one callable unit of the first container image and at least one system call of the corresponding first application container, wherein the first mapping is different from each of at least one second mapping between at least one callable unit of at least one second container image and at least one system call of at least one second application container;
monitor the operation of a runtime execution of the first application container; and
detect a violation of the security profile based on the runtime execution of the first application container, wherein the security profile is of the first container image corresponding to the first application container.

27. A host device for generating a whitelist of system calls of application containers, comprising:
a processing system; and
a memory, the memory containing instructions that, when executed by the processing system, configure the host device to:
receive an event indicating that a first container image requires profiling, wherein the first container image includes resources utilized to execute a corresponding first application container;
scan contents of the first container image to identify programs;
detect callable units in each identified program;
map each detected callable unit in the identified programs to at least one system call; and
save the mapped system calls as a whitelist in the security profile, wherein the security profile includes a system calls profile, wherein the system calls profile includes a first mapping between the detected callable units and the respective mapped at least one system call, wherein the first mapping is different from each of at least one second mapping between at least one callable unit of at least one second container image and at least one system call of at least one second application container.

28. A host device for securing execution of software containers using security profiles, comprising:
a processing system; and
a memory, the memory containing instructions that, when executed by the processing system, configure the host device to:
receive an event indicating that a first container image requires profiling, wherein the first container image includes resources utilized to execute a corresponding first application container;
generate a security profile via static analysis of the first container image, wherein the static analysis occurs without execution of the first container image, wherein the security profile includes a system calls profile, wherein the system calls profile includes a first mapping between at least one callable unit of the first container image and at least one system call of the corresponding first application container, wherein the first mapping is different from each of at least one second mapping between at least one callable unit of at least one second container image and at least one system call of at least one second application container;
monitor the operation of a runtime execution of the first application container; and detect a violation of the security profile based on the runtime execution of the first application container, wherein the security profile is of the first container image corresponding to the first application container.

\* \* \* \* \*